(12) United States Patent
Becker et al.

(10) Patent No.: US 8,017,019 B2
(45) Date of Patent: Sep. 13, 2011

(54) FLUIDIZED BED PRECIPITATOR WITH OPTIMIZED SOLIDS SETTLING AND SOLIDS HANDLING FEATURES FOR USE IN RECOVERING PHOSPHORUS FROM WASTEWATER

(75) Inventors: Gina Young Becker, Manhattan, KS (US); Sigifredo Castro Diaz, Manhattan, KS (US); Michael Hanson, Edmond, OK (US); Kylo Martin Heller, Tescott, KS (US); Dean Thompson, St. Joseph, MO (US)

(73) Assignees: Kansas State University Research Foundation, Manhattan, KS (US); Kansas Environmental Management Associates, LLC, Topeka, KS (US)

( * ) Notice: Subject to any disclaimer, the term of this patent is extended or adjusted under 35 U.S.C. 154(b) by 552 days.

(21) Appl. No.: 12/139,281

(22) Filed: Jun. 13, 2008

(65) Prior Publication Data

US 2008/0314838 A1     Dec. 25, 2008

Related U.S. Application Data

(60) Provisional application No. 60/943,986, filed on Jun. 14, 2007.

(51) Int. Cl.
*C02F 1/52* (2006.01)
(52) U.S. Cl. ........ 210/709; 210/715; 210/718; 210/741; 210/802; 210/803; 210/903; 210/906
(58) Field of Classification Search .................... 210/709
See application file for complete search history.

(56) References Cited

U.S. PATENT DOCUMENTS

| | | | |
|---|---|---|---|
| 2,946,439 A * | 7/1960 | Condolios et al. | 209/157 |
| 3,050,383 A | 8/1962 | Wilson | |
| 3,348,910 A | 10/1967 | Goodenough et al. | |
| 3,459,530 A | 8/1969 | Hudson | |
| 3,476,510 A | 11/1969 | Kern et al. | |
| 3,510,266 A | 5/1970 | Midler, Jr. | |
| 3,892,539 A | 7/1975 | Midler, Jr. | |
| 3,933,577 A | 1/1976 | Penque | |
| 3,966,450 A | 6/1976 | O'Neill et al | |
| 4,075,095 A * | 2/1978 | Parnaby | 210/793 |
| 4,141,824 A * | 2/1979 | Smith | 210/618 |
| 4,321,078 A | 3/1982 | Michaud | |
| 4,389,317 A | 6/1983 | Trentelman et al. | |
| 4,431,543 A | 2/1984 | Matsuo et al. | |
| 4,457,773 A | 7/1984 | Sley | |
| 4,576,627 A | 3/1986 | Hughes | |

(Continued)

*Primary Examiner* — Peter A Hruskoci
(74) *Attorney, Agent, or Firm* — Hovey Williams LLP

(57) ABSTRACT

Improved fluidized bed precipitators (20, 46, 62, 74, 108, 112, 134, 168) especially useful for the treatment of waste waters containing soluble phosphorus are provided, having upright, primary fluidized bed sections (22, 48, 64, 76, 110, 114, 136) and obliquely oriented solids settling sections (28, 54, 68, 120, 144) which enhance the settling of small particles (166) and return thereof to the fluidized bed sections (22, 48, 64, 76, 110, 114, 136). The precipitators (20, 46, 62, 74, 108, 112, 134, 168) may also be equipped with a solids detection/withdrawal assembly (178) made up of one or more pressure transducers (180, 182) operable to determine the pressures within the fluidized bed sections 22, 48, 64, 76, 110, 114, 136) as a measure of bed densities, along with a selectively operable valve (172) which may be opened to periodically remove solids without clogging. The precipitators (20, 46, 62, 74, 108, 112, 134, 168) may be used to control soluble phosphorus levels in single- or multiple lagoon (184, 186) waste water systems.

15 Claims, 6 Drawing Sheets

U.S. PATENT DOCUMENTS

| | | | |
|---|---|---|---|
| 4,783,255 A * | 11/1988 | Bogusch | 210/802 |
| 4,802,991 A * | 2/1989 | Miller | 210/705 |
| 5,166,505 A * | 11/1992 | Gorriz et al. | 250/201.7 |
| 5,294,348 A | 3/1994 | Horny et al. | |
| 5,443,613 A | 8/1995 | Robinson | |
| 5,720,882 A | 2/1998 | Stendahl et al. | |
| 5,993,503 A | 11/1999 | Kruidhof | |
| 6,409,788 B1 | 6/2002 | Sower | |
| 6,531,058 B1 * | 3/2003 | Josse et al. | 210/151 |
| 6,682,578 B2 | 1/2004 | Sower | |
| 6,692,642 B2 | 2/2004 | Josse et al. | |
| 6,776,816 B1 | 8/2004 | Ringelberg et al. | |
| 6,846,343 B2 | 1/2005 | Sower | |
| 6,994,782 B2 | 2/2006 | Bowers et al. | |
| 7,005,072 B2 | 2/2006 | Bowers et al. | |
| 7,429,332 B2 * | 9/2008 | Surjaatmadja et al. | 210/799 |
| 7,622,047 B2 * | 11/2009 | Koch et al. | 210/709 |

* cited by examiner

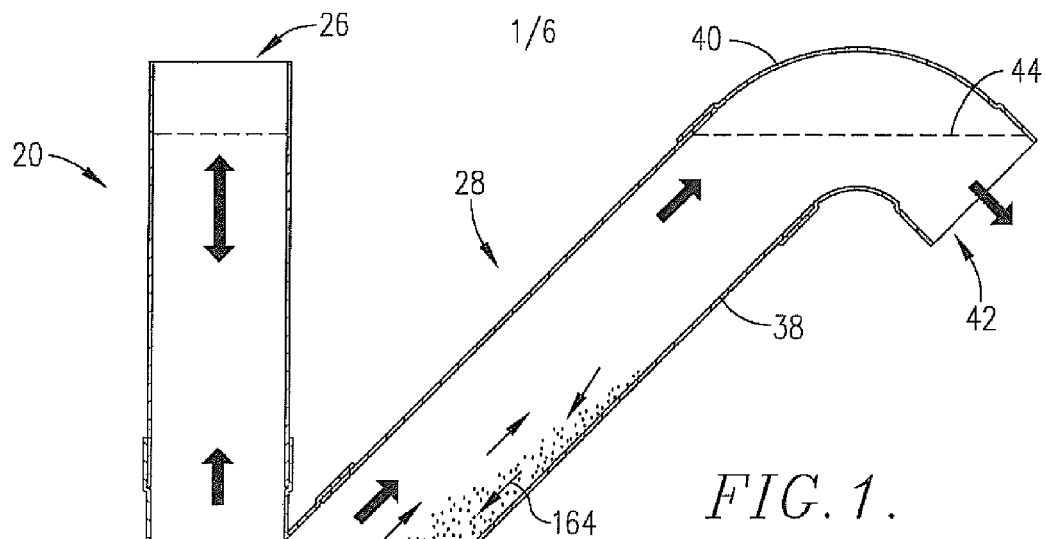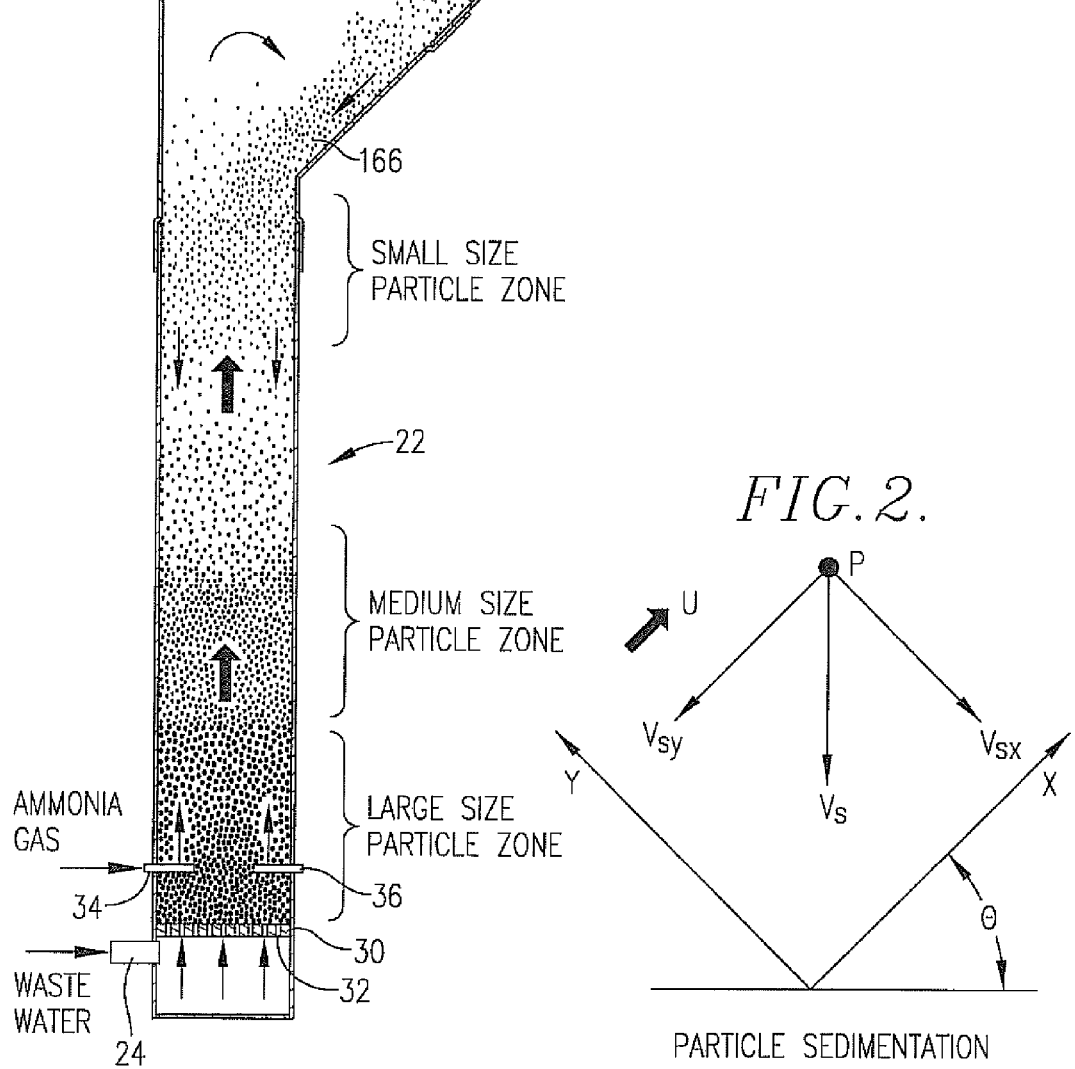

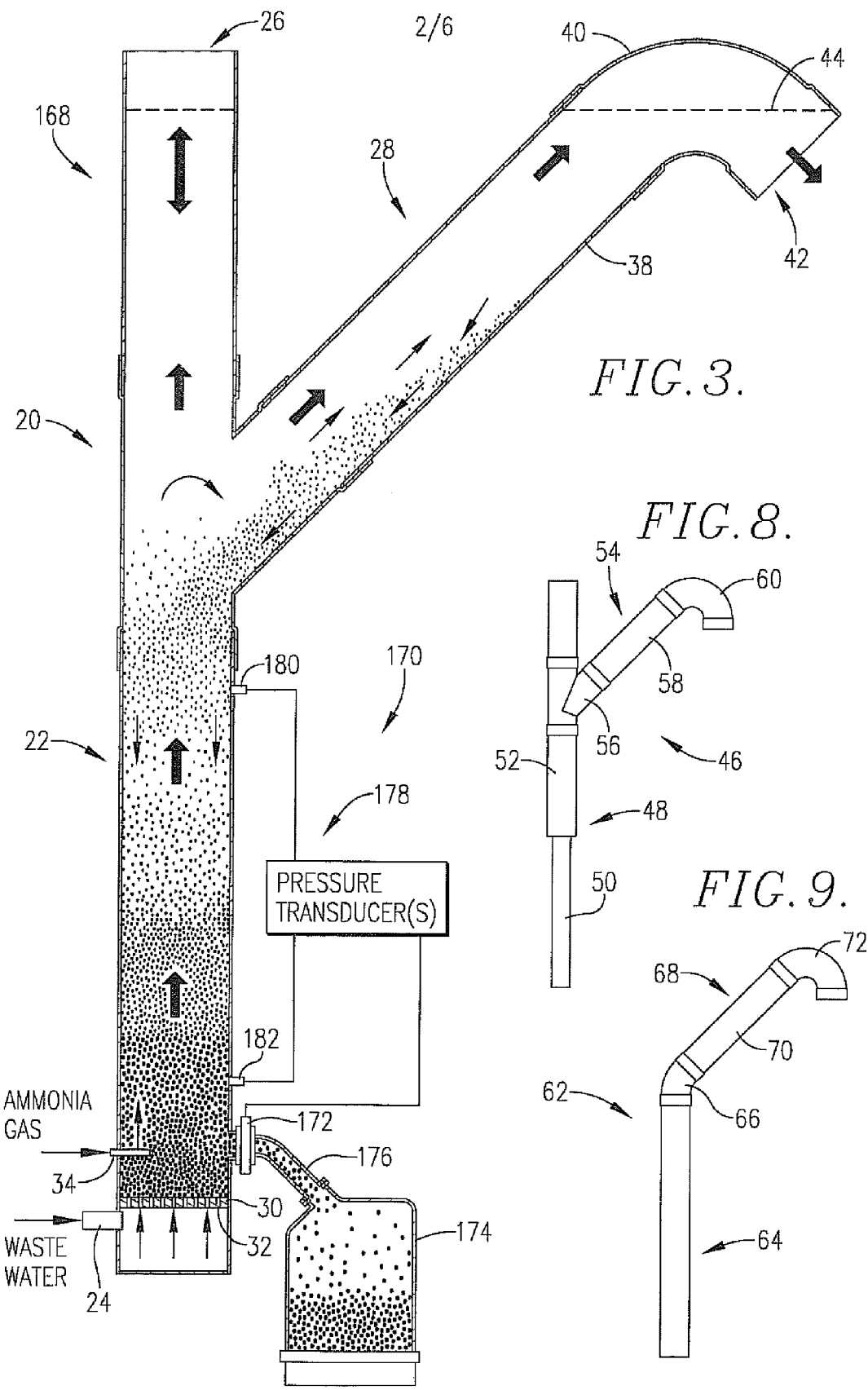

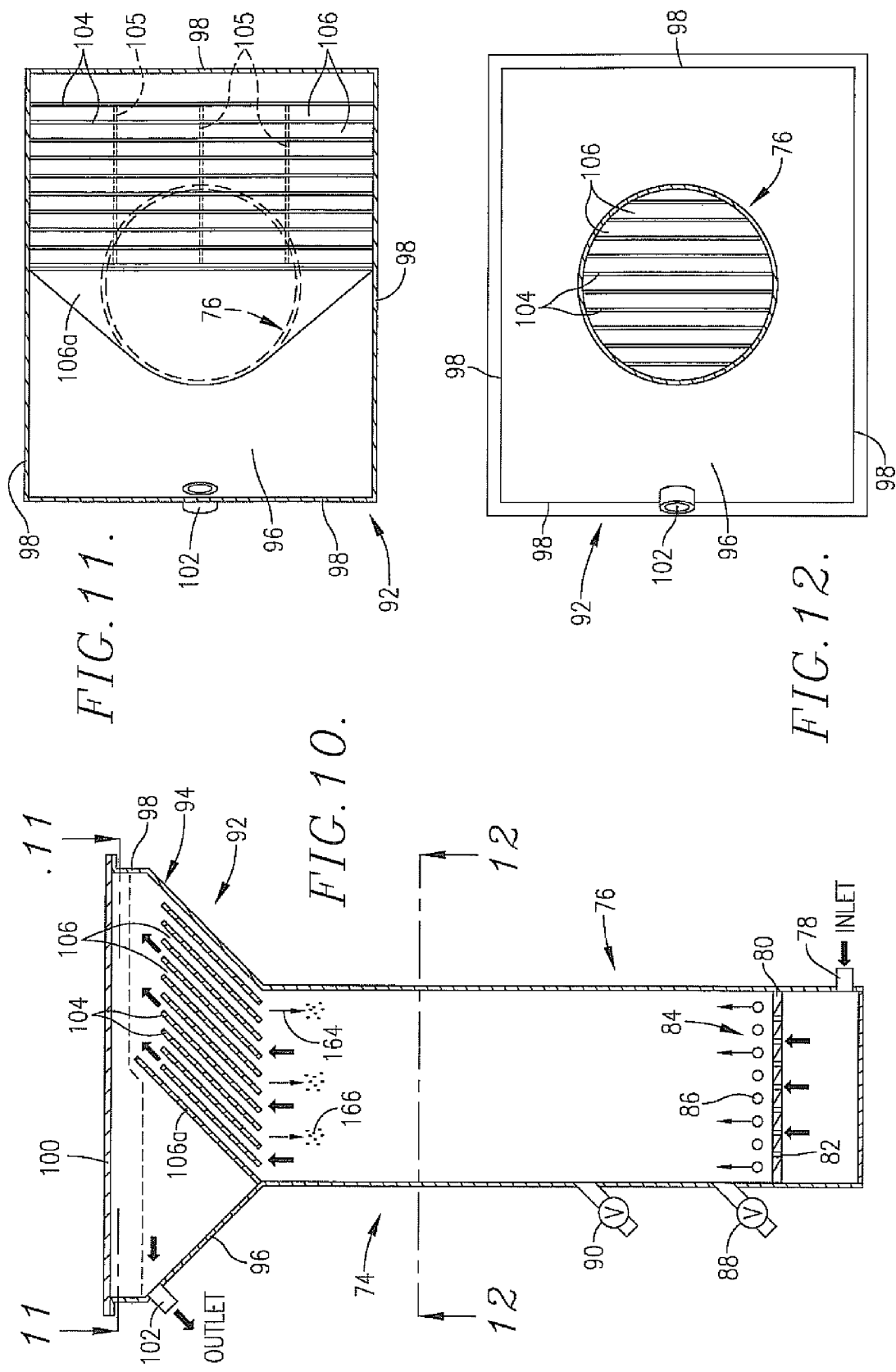

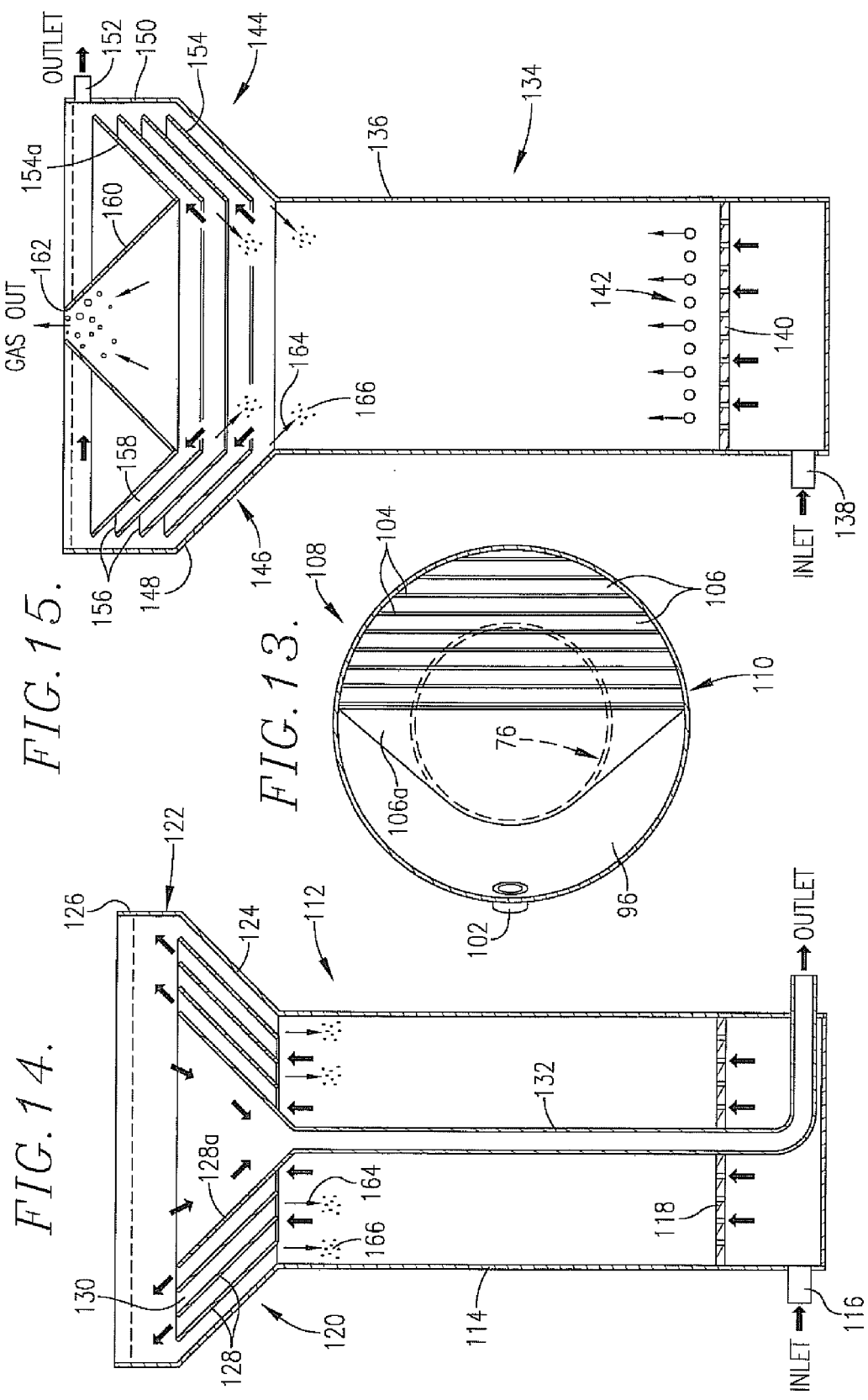

FLUIDIZED BED PRECIPITATOR WITH OPTIMIZED SOLIDS SETTLING AND SOLIDS HANDLING FEATURES FOR USE IN RECOVERING PHOSPHORUS FROM WASTEWATER

CROSS-REFERENCE TO RELATED APPLICATION

This application claims the benefit of Provisional Application Ser. No. 60/943,986, filed Jun. 14, 2007, and such Provisional Application is incorporated by reference herein in its entirety.

GOVERNMENT RIGHTS

This invention was made with U.S. Government support under Grant No. 69-6215-6-06001 awarded by USDA/NRCS. The U.S. Government has certain rights in the invention.

BACKGROUND OF THE INVENTION

1. Field of the Invention

The present invention is broadly concerned with improved fluidized bed precipitators particularly designed for use in treating phosphorus-containing collected animal waste liquids from concentrated animal feeding operations. The precipitators have an upright primary tubular section and an upper settling section oriented at an oblique angle relative to the upright primary tubular section in order to facilitate solids precipitation. In other aspects of the invention, fluidized bed precipitators are provided having pressure sensor-controlled systems for monitoring the buildup of solids and to periodically withdraw collected solids from the precipitators without clogging of outlet ports or the like.

2. Description of the Prior Art

The handling of livestock manures or wastes is a significant problem in Concentrated Animal Feeding Operations (CAFOs) such as cattle feedlots. These wastes contain nutrients such as carbon, nitrogen, and phosphorus, and is often flushed with water from animal confinement areas into a lagoon for treatment and storage. In addition, to avoid the over-filling of the lagoon that would otherwise result from the net inputs of waste and rainwater, an effluent stream is withdrawn and directed as irrigation water onto soil supporting crops.

In the lagoon, anaerobic microbes remove organic carbon compounds by converting them into the volatile gases carbon dioxide and methane. These gases may escape to the atmosphere or be collected as biogas and combusted for energy recovery.

Nitrogen, which exists primarily in forms of ammonia in the lagoon, may partly volatilize into the atmosphere from the lagoon or during irrigation. The crop acreage is typically calculated to allow for uptake by the crops of the applied nitrogen from the soil, thus minimizing movement of nitrogen in ground and surface water beyond the farm's boundaries. In addition, to reduce the amount of ammonia escaping to the atmosphere and/or to reduce the demand for nitrogen uptake by crops, processes are under development for removal of nitrogen by microbes. In these processes, aerobic microbes convert ammoniacal forms of nitrogen to oxidized forms such as nitrate, followed by conversion of the oxidized forms to nitrogen gas by anaerobic microbes. The nitrogen gas escapes to the atmosphere, thus removing nitrogen.

Unlike carbon and nitrogen, phosphorus cannot volatilize from the system. In the lagoon, it exists partly as inorganic phosphorus, organic phosphorus and as orthophosphate phosphorus (OP), none of which can evaporate or be converted by microbes to gaseous forms. Some phosphorus may be removed from the wastewater by settling of phosphorus-containing solids to the lagoon bottom; however, this process does not ultimately remove the nutrient from the system, and appreciable phosphorus remains dissolved in the lagoon water. The irrigated crops typically take up from the soil less phosphorus than that applied in the irrigation water, because the acreage has been calculated for nitrogen removal, which requires less acreage. The soil therefore absorbs and accumulates phosphorus which can be carried by surface waters beyond farm boundaries, risking depletion of oxygen in those waters by accelerating growth of oxygen-consuming aquatic organisms. New processes mentioned above for nitrogen removal will, if anything, worsen the phosphorus excess as the acreage requirements for nitrogen removal shrink. Measures to reduce the phosphorus content of the lagoon effluent must be therefore be considered.

Methods to remove solids, such as centrifugation, filtration, and settling, will remove much of the insoluble phosphorus. For removal of soluble phosphorus, three methods may be considered: (1) removal of phosphate-accumulating microbes; (2) precipitation by iron or calcium addition; and (3) precipitation as struvite (magnesium ammonium phosphate, $Mg\,NH_4\,PO_4.6H_2O$, (MAP)). The latter method is often preferred, inasmuch as the struvite can be grown to large, easily separable particles. Precipitation of struvite as a phosphorus recovery method has been investigated since at least 1969, as exemplified by a report to the US Department of Interior entitled Ultimate Disposal of Phosphate from Waste Water by Recovery as Fertilizer-Phase I-Final Report, suggesting the use of various additives to force the precipitation of struvite.

Struvite precipitation has been suggested as a process for removing phosphorus from lagoon wastewater. In this process, the concentration of magnesium ($Mg^{2+}$) ions, ammonium ($NH_4^+$), and phosphate ($PO_4^{3-}$) ions must be brought high enough that the equilibrium solubility product of struvite is exceeded. In addition, there must be enough Mg and ammonium ($NH_4^+$) ions present in stoichiometric comparison to the phosphorus so that, as precipitation occurs, the solubility product will continue to be exceeded until the phosphorus reduction goal has been met. Although lagoon wastewater usually contains ammonium and some magnesium, magnesium is often added in excess of the stoichiometric ratio, in order to drive the precipitation reaction to remove the targeted amount of phosphorus. In addition, pH elevation by chemical addition may be necessary to achieve a thermodynamic state of low struvite solubility. The main advantage of struvite precipitation is that the precipitate can be made to form a coarse-grained material that is easily drained of its water and is thus less expensive to handle and transport.

A fluidized bed is a common, efficient, and flexible piece of equipment used in many chemical production processes, including precipitation, crystal (or particle) growth, catalyzed reaction, bio-reaction, polymerization, particle coating, mass transfer, heat exchange, and solid drying processes. Fluidized beds have been used for precipitating, growing, and retaining solid particles since at least 1970 (see, U.S. Pat. No. 3,510,266). In a fluidized bed, solid particles flow much in the manner of a fluid as they are suspended and moved by an upward flowing fluid, maximizing solids-fluid contact. By comparison, in a packed bed, fluid often develops channels through the solids so that much of the solid surface area is not used for its intended purpose. The advantages of a fluidized bed include (1) the ability to operate as a continuous flow process (vs. batch), (2) good mixing of both mass and energy without the use of stirrers or other mixing equipment, (3) good liquid-solids and/or liquid-solids-gas contact, and (4) solids/liquid separation that takes advantage of the forces of gravity and upward flow at flow rates fine-tuned to cause separation of two materials. The solid particles in a fluidized bed can serve as reactant, catalyst, product, or seed material for precipitation and particle growth. The solid particles are fluidized by the upward flow of a fluid, gas and/or liquid, which provides for good contact between the surface of the solid particles and the upward flowing fluid. In addition to an upward flowing fluid, a fluidized bed might also have either (1) another upward flowing fluid, or (2) another downward flowing fluid of higher specific gravity than the upward flowing fluids.

The solid particles are fluidized by fine-tuning the overall upward velocity so that the average sum of forces on the particles (i.e., frictional between particles and fluid, gravitational) in the bed is close to zero, thus maintaining the density of particles in the bed between an upper and lower limit. Because the velocities of upward flowing fluids are greater in the center of a column and weaker toward the walls of the column where drag forces are higher, the solid particles in the center of a fluidized bed will be generally rising while solids near the wall will be generally falling, while mostly, if optimized being retained in the bed.

In fluidized bed systems, some undesired entrainment occurs as solids are carried out of the fluidized bed with the exiting upward-flowing fluid. Fluidized beds of relatively narrow particle-size distribution exhibit two distinct zones, a lower, denser zone and an upper, sparser zone. The lower zone is the main fluidized region, where reactions and interactions occur. The distinct line separating these two zones is called the "freeboard height," and the upper zone, between the main bed and the fluid exit, is called the "freeboard." Some solids from the main fluidized bed are propelled into the freeboard, and they either fall back into the fluidized bed or are carried out with the exiting liquid. The higher the freeboard height, the fewer solid particles will escape. However, for any given flow velocity, particles smaller than a certain size will escape the column, regardless of how high the freeboard height is raised. The height above which entrainment doesn't increase much with added freeboard height is called the transport disengaging height (TDH). Additionally, when turbulence is present in the fluidized bed (this can occur for flow rates with Reynold's numbers above 2,320), medium and larger size particles can also escape. Therefore, flow rates are limited to below which turbulence causes an unacceptable amount of solids to escape the column.

For the best operation of a fluidized bed, particle size should be narrow, so that flow can be set at a precise rate for good fluidization with minimal loss of particles by entrainment. Optimized flow is such that the flow velocity in the column falls between the minimum flow velocity for fluidization ($u_{mf}$) and the terminal velocity ($u_t$) for the greatest number of particles in a size range, calculated as follows:

$$u_t = \sqrt{\frac{4d_p * (\rho_s - \rho_g)g}{3\rho_g C_D}} \quad (1)$$

where $d_p$=particle diameter
$\rho_s$=particle density
$\rho_g$=fluid density $C_D$=particle drag coefficient, which can be determined experimentally or via available equations, such as the Haider and Levenspiel equation.

Terminal velocity is equal to the maximum upward flow rate against which the force of gravity will cause a given particle to resist entrainment. By the equation shown, it is obvious that particles of different sizes, densities, and/or surface characteristics have different maximum flow rates above which they will be entrained in the same fluid.

Likewise, the minimum upward velocity for which a bed of particles separate and become fluidized is determined by particle size, density, and surface characteristics, as shown by the following quadratic equation that can be solved by iterative analysis:

$$\frac{1.75}{\varepsilon_{mf}^3 \Phi_s} * \sqrt{\frac{d_p u_{mf} \rho_g}{\mu}} + \frac{150(1-\varepsilon_{mf})}{\varepsilon_{mf}^3 \Phi_s^2} * \frac{d_p u_{mf} \rho_g}{\mu} = \frac{d_p^3 \rho_g (\rho_s - \rho_g)g}{\mu^2} \quad (2)$$

where $u_{mf}$=minimum velocity for fluidization
$d_p$=particle diameter
$\rho_s$=particle density
$\rho_g$=fluid density
$\varepsilon_{mf}$=voidage in bed at minimum fluidizing conditions
$F_s$=sphericity (surface area of sphere/surface area of particle) of same volume
$\mu$=actual fluid viscosity The relationships among minimum fluidization velocity and particle characteristics are more easily shown in the simplified equation for small particles, where $u_{mf}$ can be solved for analytically:

$$u_{mf} = \frac{d_p^2(\rho_s - \rho_g) * g}{150\mu} * \frac{\varepsilon_{mf}^3 \Phi_s^2}{1-\varepsilon_{mf}}, \text{ for } Re_{p,m} < 20, \text{ where } Re_{p,m} = \frac{d_p u_{mf} \rho_g}{\mu}$$

KUNII, D. and Octave Levenspiel. *Fluidization Engineering*. 2nd Ed. Butterworth-Heinemann, 1991. p. 80.

These equations demonstrate that particles that are denser, larger, and more spherical have higher terminal velocities and higher minimum fluidization velocities, while particles that are less dense, smaller, and less spherical have lower terminal velocities and lower minimum fluidization velocities. Therefore, a broad particle size distribution creates problems, since at any given flow rate, more particles will either not be fluidized or will escape the column than when particle size distribution is narrow. Accordingly, costly measures are often taken to create or purchase solids that maintain a uniform size. The problem is exacerbated in precipitation and/or crystal growth applications that inherently require broad particle distribution, since particles grow from small to large, chip away from larger particles, then grow again.

For precipitation applications, a fluidized bed is typically a vertical column, of constant diameter, into which relatively ion-rich liquid enters at the bottom and relatively ion-poor liquid exits at the top of the column. The precipitated solids form and grow in the fluidized bed until they are large enough to be harvested. Often, additives are injected into the column to adjust pH or to enhance the level of a component ion of the desired precipitate. Particles form by at least three mechanisms: nucleation (ions collide to form a small particle), agglomeration (smaller particles collide to form larger particles) and crystal growth (ions collide on a solid particle and are added to the mass of the particle). Crystal growth and agglomeration are mechanisms that form relatively stable crystals, whereas nucleation forms crystals that are more likely to disassociate, so that it is important to have a large amount of crystal surface area on "seed particles" in the column to form stable particles. A given mass of smaller particles supplies more surface area than the same mass of larger particles, so that smaller particles are more effective as precipitation sites. Particles are allowed to grow in the column, and periodically, larger particles are removed from the bottom of the column through a valve or plugged outlet.

The flow rate of a fluidized bed must be optimized, high enough to allow for good fluidization motion of the solid particles but low enough so that smaller precipitated particles are not carried out in the fluid flow at the top of the column, which is especially difficult in precipitation reactions where particle size distribution is broad. To accomplish balance, the top section of the column is sometimes of a larger diameter (giving lower velocity at a given volumetric flow rate) and the bottom section of a smaller diameter (giving higher velocity and better mixing at a given volumetric flow rate) to allow for good fluidization in the bottom section and good settling in the top section. Sometimes the fluidized bed comprises two cylindrical pieces, one of a smaller diameter and one of a larger diameter (the larger diameter section has been called an "expansion tank," with a transition piece in between, while other times it is shaped like a cone, with the downward tip of the cone removed. In some processes, two concentric cylinders are used, so that upward flow, mixing and precipitation occur in the inner cylinder, while settling occurs in the outer cylinder.

One problem with existing fluidized bed precipitators is that small particles are difficult to retain in the column, even when the column is equipped with a large-diameter top section for improved settling. As is apparent by the Reynold's Number equation, which predicts turbulent flow (higher Re value indicates more likelihood of turbulence), larger column or pipe diameters create more turbulence at constant velocity than smaller diameters:

$$Re = \frac{\rho VD}{v}$$

where, $\mu$=fluid density
V=free-stream fluid velocity
D=pipe or column diameter
v=fluid viscosity For the same volumetric flow rate, a larger diameter yields a lower velocity, but the advantageous laminarizing effects of lowered velocity are partially offset by the turbulence-inducing effects of larger diameter. Additionally, turbulence can be exacerbated when gases, such as air or ammonia, are injected into the column as additives, since the gas bubbles cause turbulence and so can keep particles suspended in intended settling zones.

A second problem with fluidized bed precipitators is that large particles are sometimes difficult to remove from the bed while the unit is operating. When a drain valve is opened, the bed can compress, causing clogging. Also, when a drain valve is opened, large amounts of water are released to withdraw a relatively small amount of solids.

A problem with fluidized beds used as struvite precipitators is that they can require one or more liquid and/or additives for operation, which require additive pumps and stirrers that complicate the system. Fluidized beds for precipitating phosphate ions have used liquid additives for adjusting pH and for contributing ammonia and/or magnesium ions to achieve supersaturation of component ions that favors the formation of struvite as a precipitated compound. Injecting liquids, however, requires that the system be equipped with additive pumps, additive tanks, and stirrers, when the liquid is a slurry. To form struvite, a magnesium source is often added (i.e., MgCl, MgSO4, MgO, Mg(OH)2), but the magnesium source is expensive and/or difficult to use. MgSO4, for example, is easy to use but expensive. On the other hand, MgO and Mg(OH)2, are less expensive, but because they have a very low solubility, usage requires pumping, stirring, and the addition of acid to increase their solubilities, all of which add expense.

A problem with fluidized bed precipitators for use on some cattle feedlots is that there are typically not two lagoons (wastewater ponds) in series through which all the feedlot water flows. Instead, rainfalls wash into a number of lagoons, which are quickly drained at high pumping rates to one or more final lagoons that are sourced for irrigation. To operate a precipitator as they are normally operated, between two lagoons in series, several very large systems capable of handling in the range of 300 to 1000 gpm could be needed on the feedlot, and these systems would only operate for short periods, a few days to a few weeks, at a time.

The following references describe various phosphorus removal processes including fluidized bed precipitator systems: U.S. Pat. Nos. 7,005,072; 6,994,782; 6,692,642; 6,846,343; 6,682,578; 6,776,816; 6,409,788; 5,993,503; 5,720,882; 5,443,613; 5,294,348; 4,576,627; 4,457,773; 4,431,543; 4,389,317; 4,321,078; 3,933,577; 3,892,539; 3,510,266; 3,476,510; 3,459,530; 3,348,910; 3,050,383; and 3,966,450.

See also, Adnan, A., D. S. Mavinic, and F. A. Koch. 2003. Pilot-scale Study of Phosphorus Recovery Through Struvite Crystallization-Examining the Process Feasibility. *Journal of Environmental Engineering Science.* 2; 315-24; Adnan, A., M. Dastur, D. S. Mavinic, and F. A. Koch. 2004. Preliminary Investigation into Factors Affecting Controlled Struvite Crystallization at the Bench Scale. *Journal of Environmental Engineering and Science* 3, 195-202; Buchanan, J. R., C. R. Mote, and R. B. Robinson. 1994. Thermodynamics of Struvite Formation. *American Society of Agricultural Engineers.* 37(2): 617-21; Buchanan, J. R., C. R. Mote, and R. B. Robinson. 1994. Struvite Control by Chemical Treatment. *American Society of Agricultural Engineers.* 37(4): 1301-08; Beal, L. J., Burns, R. T., Stalder, K. J. Effect of Anaerobic Digestion on Struvite Production for Nutrient Removal from Swine Waste Prior to Land Application. 1999. *Presentation at ASAE Annual International Meeting.* 1-11; Burns, Robert T., and L. B. Moody. 2002. Phosphorus Recovery from Animal Manures Using Optimized Struvite Precipitation. Proceedings of Coagulants and Flocculants: Global Market and Technical Opportunities for Water Treatment Chemicals. Chicago; Celen, Turker, M. 2001. Recovery of Ammonia as Struvite from Anaerobic Digester Effluents. *Environmental Technology* 22, 1263-72; Celen, I., F. Walker, and J. Buchanan. 2005. Phosphorus Removal Technologies as a Tool for TMDLs. *ASAE Publication Number* 701P0105; Chah, W. L., H. B. Kwon, J. K. Young, and P. J. Hong. Nutrients Recovery from Wastewater in a Fluidized Bed Reactor. *Materials Science Forum* 486, 387-90; Choi, E. and Y. Eum. 2002. Strategy for Nitrogen Removal from Piggery Waste. *Water Science & Technology* 46:6-7, 347-54; DeSutter, T. M., Ham, J. M., Trooien, T. P. 2000. Survey of Waste Chemistry of Anaerobic Lagoons at Swine Production Facilities and Cattle Feedlots. Southwest Research and Extension Center, Department of Agronomy, Kansas State University. Manhattan; Doyle, J. D., and S. A. Parsons. 2002. Struvite Formation, Control and Recovery. *Water Research* 36, 3925-40; Suzuki, K., Y.

Tanaka, K. Kuroda, D. Hanajima, and Y. Fukumoto. 2005. Recovery of Phosphorus from Swine Wastewater Through Crystallization. *Bioscience Technology* 96, 1544-50; Kim, B. U., W. H. Lee, H. J. Lee, and J. M. Rim. 2004. Ammonium Nitrogen Removal from Slurry-type Swine Wastewater by Pretreatment Using Struvite Crystallization for Nitrogen Control of Anaerobic Digestion. *Water Science and Technology* 49:5-6, 215-22; Lee, S. I. S. Y. Weon, C. W. Lee, and B. Koopman. 2003. Removal of Nitrogen and Phosphate from Wastewater by Addition of Bittern. *Chemosphere* 51, 265-71; Miles, A. and T. G. Ellis. 2001. Struvite Precipitation Potential for Nutrient Recovery from Anaerobically Treated Wastes. *Water Science and Technology* 43:11, 259-66; Nelson, N. O., R. L. Mikkelsen, D. L. Hesterberg. 2003. Struvite Precipitation in Anaerobic Swine Lagoon Liquid: Effect of Ph and Mg:p Ratio and Determination of Rate Constant. *Bioresource Technology* 89, 229-36; Ohlinger, K. N., T. M. Young, and E. D. Schroeder. 2000. Postdigestion Struvite Precipitation Using a Fluidized Bed Reactor. *Journal of Environmental Engineering* 126(4), 361-8; Parsons, S. and J. Doyle. 2001. CHIMICA OGGI/chemistry today; Parsons, S. A., F. Wall, J. Doyle, K. Oldring, and J. Churchley. 2001. Assessing the Potential for Struvite Recovery at Sewage Treatment Works. *Environmental Technology* 22, 1279-86; Salutsky, M. L., M. G. Dunseth, K. M. Ries, and J. J. Shapiro. 1970. Ultimate Disposal of Phosphate from Wastewater by Recovery as Fertilizer. Chemical Engineering Progress Symposium Series; Suzuki, K., Y. Tanaka, K. Kuroda, D. Hanajima, and Y. Fukumoto. 2005. Recovery of Phosphorus from Swine Wastewater Through Crystallization. *Bioresource Technology* 96, 1544-50; Uludag-Demirer, S.; G. N. Demirer, and S. Chen. 2005. Ammonia Removal from Anaerobically Digested Dairy Manure by Struvite Precipitation. *Process Biochemistry. Oxford, UK,* 3667-3675; Vanotti, M. B., A. A. Szogi, and P. G. Hunt. 2003. Extraction of Soluble Phosphorus from Swine Wastewater. *American Society of Agricultural Engineers* 46:6, 1665-74; Wu, Q., and P. L. Bishop. 2004. Enhancing Struvite Crystallization from Anaerobic Supernatant. *Journal of Environmental Engineering Science* 3, 21-29; Yoshino, M., M. Yao, H. Tsuno, and I. Somiya. 2003. Removal and Recovery of Phosphate and Ammonia as Struvite from Supernatant in Anaerobic Digestion. *Water Science and Technology* 48:1, 171-78.

SUMMARY OF THE INVENTION

The present invention overcomes the problems outlined above and provides improved fluidized bed precipitators and methods particularly suited for the treatment of phosphorus-containing animal waste liquids derived from CAFOs. In one aspect of the invention fluidized bed preciptitators are provided which comprise an elongated primary tubular section presenting a first upright longitudinal axis which are operable to create fluidized bed conditions therein. The precipitators have an inlet adjacent the bottom thereof in order to admit a fluid to be treated, and an upper, elongated settling section operably coupled with and in communication with the interior of the primary tubular section above the inlet, wherein the settling section presents a second longitudinal axis oriented at an acute angle relative to the first upright axis of the primary tubular section. The second longitudinal axis is oriented at an angle of from about 10-80°, more preferably from about 30-60°, and most preferably about 45°, relative to the first longitudinal axis.

The settling section can be thought of as a settling arm serving as an adjunct to the upright primary tubular section. The settling section can be of tubular design and have a larger, smaller, or the same diameter as the upright primary tubular section. Alternately, the settling section may comprise a series of oblique, spaced-apart plates (e.g., of frustoconical configuration) including an innermost plate and an outermost plate and cooperatively defining a plurality of individual oblique settling flow paths or subsections. However configured, the settling section provides an area outside of the primary tubular section where the vertical component of velocity of the precipitatable material in the liquid to be treated is lowered, allowing for settling, while maintaining desirable higher velocities in the primary tubular section to maintain good fluidized mixing. Additionally, baffled flow lowers turbulence further promoting settling. Particles that are small enough to be carried out of the primary tubular section at a given flow rate will enter the settling section where the vertical component of velocity is lower, such that the particles will descend towards the lower extent of the settling section, and then slide back into the primary tubular section. As the particles descend, the vertical component of flow diminishes toward zero because of drag forces, thus augmenting the settling process. The slope of the settling section thus causes the small particles to return to the primary tubular section where they grow to a size permitting eventual withdrawal.

Greater slopes in the settling section allow particles to descend more easily into the primary tubular section, but this requires longer settling sections for the same horizontal settling distance to achieve adequately diminished vertical velocity. Smaller slopes allow for shorter lengths, but can impede descent of small particles. If desired, a vibrator or tapper can be installed on the settling section to promote particle descent, especially with smaller sloped settling sections.

The precipitators also include a liquid outlet for treated liquids, which may be provided at the upper end of the settling section or as a central, downwardly extending outlet conduit. A gas outlet can also be provided to prevent gas from causing turbulence in the settling section.

In another aspect of the invention, a fluidized bed precipitator is provided with a system operable to detect the buildup of solids within an upright primary tubular section, and to periodically allow withdrawal of solids from the primary tubular section. Such a system includes a selectively operable drain valve coupled with the primary tubular section, and at least one pressure-sensing device operable to sense the pressure within solids collected in the primary tubular section. The pressure-sensing device may be a transducer or any other suitable sensor, and is operably coupled with the drain valve for opening the drain valve when the pressure within the collected solids reaches a predetermined level. Typically, a digital control device such as a PLC forms a part of the system, and receives input data from the pressure sensor and signals a valve operator to initiate valve opening as required.

In some systems, only a single pressure sensing device is used, and is compared with atmospheric pressure. In other systems, a pair of pressure sensors are located in spaced relationship along the length of the primary tubular section and are operable to sense a pressure differential between different levels of the collected solids. Although not essential, the drain valve may be connected with a liquid-tight container for collecting the precipitated solids in a fluidized state to prevent clogging.

These systems make use of the fact that as solids build up in the fluidized bed, the density of the bed increases, so that the pressure difference between two points also increases. Therefore, this detected pressure difference can be used to open and close the solids drain valve, i.e., when the pressure difference reaches a predetermined high the valve is opened, and when the pressure difference reaches a predetermined low the valve is closed.

When a liquid-tight precipitated solids container is used, the container can initially be filled with water so that withdrawn solids from the precipitators will float into the container without upward flow. In this manner, the solids settle and pack into the liquid-tight container. Optionally, the container can initially be empty, so that water and solids from the precipitator enter the container, displacing air through a vent or the like. These techniques allow for the withdrawal of solids from the precipitator with much less accompanying water than would be the case by opening a drain valve and allowing the water to "gush" with a slower, more controlled solids removal rate. They also prevent clogging often caused by the bed collapsing and densifying upon opening of the outlet valve. The liquid-tight container can be equipped with a lower valve at the bottom, so that wet solids may be transferred to a haul-off receptacle. Optionally, a removable screen can be installed adjacent the bottom of the liquid-tight container above the dump valve, so that water may be drained from the solids before being released into a haul-off receptacle.

Fluidized bed systems for precipitating phosphorus from waste waters are typically operated under the assumption that a pH adjusting additive and a magnesium ion contributor are needed to achieve high (>70%) phosphorus recovery levels. It has been believed that the magnesium ion contributor is needed even when the waste water has stoichiometric amounts of magnesium ion present therein, in order to drive the reaction to favor struvite production. However, it has been found that high phosphorus recoveries can be obtained in such fluidized bed systems by addition of an additive consisting essentially of an ammoniacal material, and especially a material selected from the group consisting of liquid ammonia, gaseous ammonia, and mixtures thereof. Use of such ammoniacal materials, in lieu of pH adjustors such as NaOH, favors struvite production over alternative precipitates, making for higher solids retainment and easier solids handling.

BRIEF DESCRIPTION OF THE DRAWINGS

FIG. 1 is a schematic view illustrating a preferred fluidized bed precipitator in accordance with the invention, including an oblique, tubular settling section;

FIG. 2 is a vector illustration mathematically depicting the utility of the oblique settling section in the fluidized bed precipitators of the invention;

FIG. 3 is a schematic view similar to that of FIG. 1, but illustrating the use of an improved solids level detection and removal system as a part of a fluidized bed precipitator, employing spaced pressure-monitoring devices to control solids removal;

FIG. 8 is a schematic illustration of another type of fluidized bed precipitator in accordance with the invention using a tubular settling section;

FIG. 9 is a schematic illustration of another type of fluidized bed precipitator in accordance with the invention, wherein the tubular settling section arm surmounts the upright section of the precipitator;

FIG. 10 is an essentially schematic vertical sectional view of a preferred type of precipitator of the invention using an upright settling section made up of a series of obliquely oriented, laterally spaced apart plates cooperatively defining a series of oblique settling subsections;

FIG. 11 is a horizontal sectional view taken along line 11-11 of FIG. 10, depicting the quadrate shape of the settling section;

FIG. 12 is a horizontal sectional view taken along line 12-12 of FIG. 10;

FIG. 13 is a horizontal sectional view similar to that of FIG. 11, but illustrating another embodiment making use of a settling section having a circular shape;

FIG. 14 is an essentially schematic vertical sectional view of a still further type of precipitator employing a settling section made up of a plurality of frustoconical, laterally spaced apart plates cooperatively defining a series of oblique settling subsections, and with a central, downwardly extending liquid outlet conduit coupled with the innermost plate; and FIG. 15 is an essentially schematic vertical sectional view of a still further type of precipitator having a multiple-plate settling section, with the innermost plate having an upstanding central section presenting a gas outlet.

DETAILED DESCRIPTION OF THE PREFERRED EMBODIMENT

Figure 4:
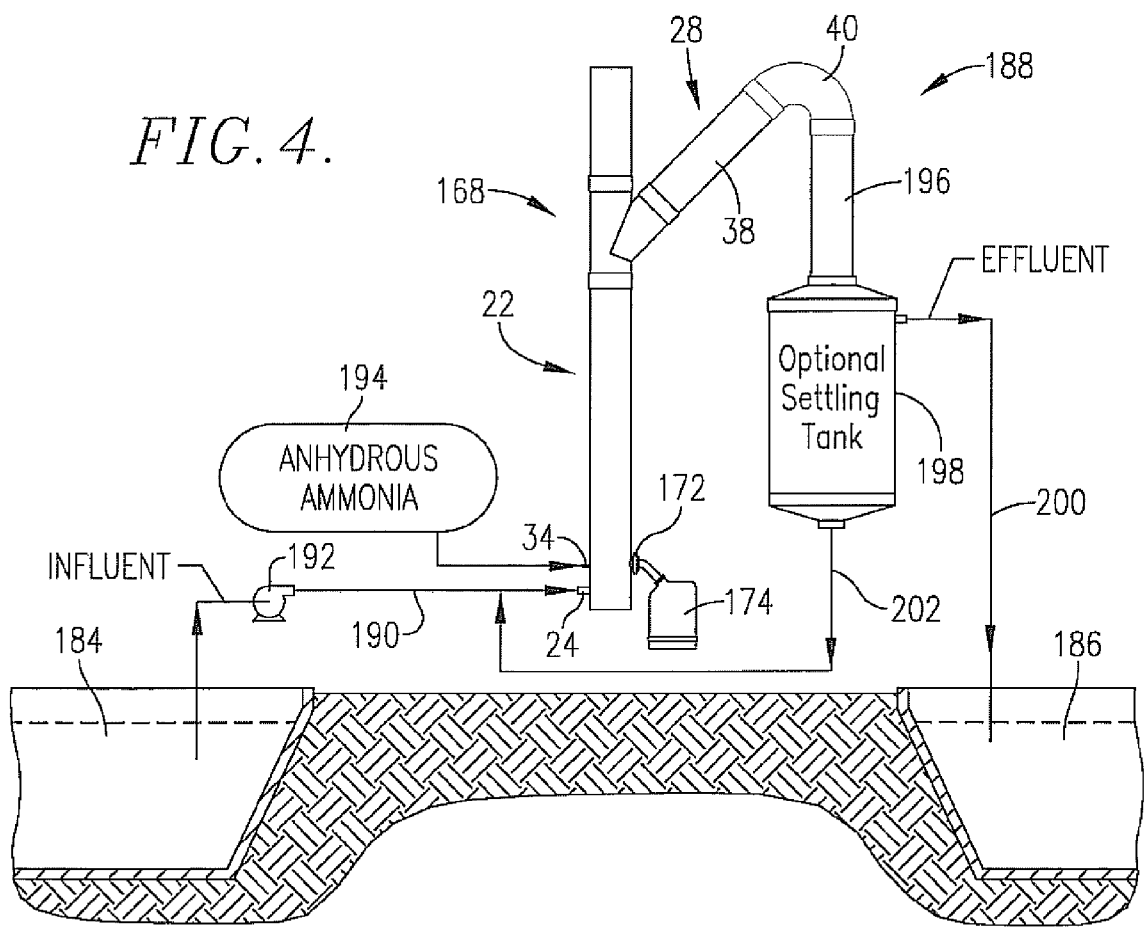
FIG. 4 is a schematic illustration of a fluidized bed precipitator system in accordance with the invention, located between a pair of collection ponds.

Turning now to the drawings, and particularly FIG. 1, a fluidized bed precipitator 20 is illustrated. The precipitator 20 broadly includes an upright, elongated primary fluidization section 22 presenting a lower inlet 24 for waste liquid and an upper outlet or vent 26, along with a settling section 28 obliquely oriented relative to the section 22. The fluidization section 22 is designed so as to create fluidization conditions therein and includes, above the inlet 24, a conventional distributor plate 30 having a series of spaced apart openings 32 therein. Additionally, the section 22 has a pair of inlets 34 and 36 for introduction of additives such as liquid or gaseous ammonia and/or pH adjustment agents. The settling section 28 is in the form of a tubular body 38 having at its upper end an elbow 40 defining a liquid outlet 42. As illustrated, the section 28 is oriented so that the longitudinal axis thereof is at an oblique angle relative to the longitudinal axis of primary section 22.

In the use of precipitator 20, a liquid to be treated, such as soluble phosphorus-containing waste water from a CAFO, is directed through inlet 24 for passage through distributor plate 30. The waste liquid then travels up the length of primary section 22 and settling section 28 until the liquid achieves the upper level 44. As previously described, the precipitator 20 is operated so as to create a fluidized bed within primary section 22. Over time, the precipitator creates a large size particle zone(s) extending upwardly from distributor plate 30, a medium size particle zone(s) above the large size particle zone(s), and a small size particle zone(s) above the medium size particle zone and extending to the open mouth of settling section 28. Owing to the effects of particle size on particle velocities throughout the section 22, the particles naturally segregate by size to form these zones.

In typical operations, particularly with CAFO waste waters, an additive such as an ammoniacal material (preferably selected from the group consisting of liquid ammonia, gaseous ammonia, and mixtures thereof) is injected into section 22 via one of the inlets 34 or 36. Moreover, as the concentration of large size particles increases, such particles are withdrawn from the section 22 on a periodic basis. At the same time, phosphorus ion-poor treated water passes from the precipitator 20 through outlet 42.

The settling section 28 comes into play as small particles are carried out of the section 22 by the rising liquid. In the section 28 these small particles have a vertical component of velocity lower than that of the section 22. Hence, these particles tend to fall toward the lower wall portions of the section 28 and the vertical component of flow diminishes toward zero further augmenting settling. The oblique slope of the section 28 thus causes the small particles to slide back into primary section 22 where they grow and are eventually withdrawn from the precipitator. This is illustrated in FIG. 2 which is a vector representation of particle settling velocities. As shown, $V_s$ is the normal settling velocity of a particle P, whereas $V_{sx}$ is the velocity component in the X-direction and $V_{sy}$ is the velocity in the Y-direction, and U is the liquid velocity in the X-direction. Considering a settling section 28 oriented at an angle θ relative to the horizontal, the following equations are applicable:

$$V_{sx} = U - V_s \sin\theta$$

$$V_{sy} = -V_s \cos\theta$$

Additionally, the FIG. 1 embodiment allows any gas additives to escape without disrupting settling.

The precipitators of the invention can be constructed in a variety of manners while still retaining the important features of the invention. Thus, FIG. 8 illustrates a precipitator 46 made up of a primary fluidization section 48 including a pair of interfitted tubular components 50, 52 of different diameters, and wherein the oblique tubular settling section 54 is formed by an angled wye 56 and an attached conduit 58, the latter having an uppermost elbow 60.

FIG. 9 depicts a fluidized bed precipitator 62 having a tubular primary fluidization section 64 with an uppermost 45° elbow 66. The oblique settling section 68 is made up of a conduit 70 connected with elbow 66 and having an uppermost 90° elbow 72. Although not specifically shown, it will be appreciated that the precipitators 46 and 62 are also equipped with lower inlets, distributor plates, and outlet valve arrangements, as in the case of the FIG. 1 embodiment.

FIGS. 10-12 illustrate a fluidized bed precipitator 74 having an upright primary fluidization section 76 equipped with an inlet 78, distributor plate 80 having plural openings 82, and an ammonia injection system 84 including a plurality of injector pipes 86 located above and across the width of distributor plate 80. As illustrated, the section 76 also has a pair of vertically spaced apart valves 88, 90 for withdrawal of solids from the section 76.

The precipitator 74 has a settling section 92 different from that of the previously described embodiments. The section 92 is in the form of a housing 94 which is quadrate (e.g., square or rectangular) in plan configuration, having an oblique, continuous outer wall 96 extending from the upper end of section 76, with four vertical top walls 98. A cover 100 extends over and is secured to the upper ends of walls 98. The wall 96 is equipped with a liquid outlet 102 as shown.

The settling section 92 also has a plurality of planar, obliquely oriented, laterally spaced apart baffle plates 104 which cooperatively define a series of oblique flow paths or subsections 106, and may be supplemented with transverse baffle plates 105 if desired. Such plates 104 and 105, if used, reduce turbulence and increase laminar flow in the section 92. These plates also reduce the distance that a particle must fall into the very low velocity regions near the settling surface, thereby lowering the likelihood that particles will escape the precipitator. The lefthand plate 106a as illustrated in FIGS. 10 and 11 is of arcuate, somewhat triangular configuration, and has a height greater than that of the remaining plates, thus presenting a weir plate relative to outlet 102.

FIG. 13 illustrates a very similar type of precipitator 108 which is identical with that illustrated in FIGS. 10-12, except that the settling section 110 is circular in plan configuration. Accordingly, like reference numerals have been used in connection with FIG. 13 to designate similar parts.

FIG. 14 depicts a precipitator 112 which is likewise similar to precipitator 74 of FIG. 10. Thus, precipitator 112 has an upright, tubular primary fluidized bed section 114 equipped with an inlet 116 and distributor plate 118. The settling section 120 has a housing 122 made up of oblique transition wall 124 extending from the upper end of section 114 with an upper vertical wall 126. The interior of housing 122 includes a plurality of frustoconical, laterally spaced apart baffle plates 128 including an inboard plate 128a. The plates 128 cooperatively define a series of elongate, obliquely oriented flow paths or subsections 130. In this instance, a liquid outlet pipe 132 is secured to the lower end of innermost plate 128 and extends downwardly to terminate adjacent the lower end of section 112. The outlet pipe 132 can serve as structural support in large diameter systems.

Finally, fluidized bed precipitator 134 of FIG. 15 has an upright primary fluidized bed section 136 having inlet 138, distributor plate 140, and a multiple-pipe ammonia injection system 142. The settling section 144 includes an outer housing 146 made up of a transition wall 148 and an upper circular top wall 150 equipped with liquid outlet 152. Internally, the section 144 has a series of inverted, open-bottom frustoconical elements 154. The sidewalls 156 of the elements 154 are in oblique, laterally spaced apart relationship to cooperatively define a series of oblique liquid flow paths or subsections 158. The uppermost element 154a has an upstanding central conical element 160 terminating in an opening 162 defining a gas outlet. The opening 162 allows gaseous additives within the precipitator to vent without causing undue turbulence therein.

All of the precipitators 20, 46, 62, 74, 108, 112, and 134 operate in a similar fashion, as described with reference to precipitator 20. Specifically, all are designed to create fluidized bed conditions in the respective primary sections thereof, with consequent gradient zones of collected solids, which are periodically removed. Moreover, the individual settling sections 22, 48, 64, 76, 110, 114, and 136 operate similarly, as explained with reference to FIG. 2. The oblique orientation of the settling sections facilitates the settling out of small particles initially carried into the settling sections with consequent return thereof to the underlying primary sections. This action is illustrated in FIGS. 1, 10, 14, and 15, by the return arrows 164 and particles 166.

FIG. 3 illustrates another aspect of the invention, namely an improved method of detecting the solids level in the primary sections of the precipitators, and for withdrawing collected solids on a periodic basis. Specifically, FIG. 3 depicts a precipitator 168 made up of the previously described precipitator 20 in conjunction with solids detection and withdrawal assembly 170. As illustrated, the precipitator 20 includes all of the components of FIG. 1, and accordingly, like reference numerals have been employed. The assembly 170 includes a selectively operable, automated gate valve 172 coupled with the base of section 22, as well as a liquid-tight container 174 coupled with valve 172 via conduit 176. The valve 172 is controlled by means of a transducer system 178 operably coupled with section 22. In the embodiment shown, a pair of vertically spaced apart transducers 180, 182 are operably coupled with the section 122 in order to determine the pressure within section 22 at these spaced locations. As the solids build up in the fluidized bed within section 22, the density of the bed increases so that the pressure difference between the transducers 180, 182 likewise increases. Accordingly, such pressure difference can be used as a data input for opening the valve 172 as required, i.e., when the pressure difference hits a predetermined maximum, valve 172 is opened, and when the pressure difference decreases to a predetermined minimum, the valve 172 is closed. Although not shown, it will be appreciated that the pressure transducers are coupled to a control device such as a digital controller, which receives input from the transducers and operates valve 172. While the illustrated embodiment makes use of a pair of transducers 180, 182, a single transducer can be used, which is compared with atmospheric pressure. In either case the density within the fluidized bed is measured and this data is used to control the valve 172.

The use of a liquid-tight container 174 largely filled with water is preferred so that, when the valve 172 is opened, the solids removed from section 22 float into the container 174 against zero upward flow, thereby causing the solids to settle and pack into the container 174. Alternately, the container can be initially empty, so that when the valve 172 is opened, water from the section 22 enters the container displacing air that is released through the section 22 or through a separate vent (not shown) on container 174. Clogging is minimized because the solids in the bed are prevented from collapsing. In either instance, the solids from section 22 can be removed with much less accompanying water than would be the case by opening the valve and allowing water to freely flow from section 22. If desired, the container 174 can be equipped with a valve (not shown) at the bottom for off-loading of solids. Also, a removable screen (not shown) can be installed at the bottom of container 174, allowing water to be drained from the collected solids before off-loading thereof.

During the development of the present invention, it was discovered that adequate soluble phosphorus removal form CAFO waste water can often be effected by using only an ammoniacal additive without the addition of magnesium compounds or other additives. In practice, these systems can be used to generate struvite with use of an additive consisting essentially of such ammoniacal material and preferably selected from liquid ammonia, gaseous ammonia, and mixtures thereof.

Attention is next directed to FIG. 4, which illustrates the use of the present invention in the treatment of CAFO waste waters containing soluble phosphorus. In the FIG. 4 illustration, the CAFO has a pair of separate lagoons 184, 186 and a system 188 in accordance with the invention is used to treat the lagoon water. The system 188 includes the precipitator 168 previously described, with an influent line 190 extending from lagoon 184 and coupled with column inlet 24; a liquid pump 192 is interposed with line 190 as shown. A supply 194 of anhydrous ammonia is coupled with inlet 34 to supply ammonia to the section 22. The output from precipitator 168 passes through elbow 40 and is carried by a vertical conduit 196 to an optional settling tank 198. The settling tank 198 has an effluent line 200 leading to lagoon 186. The underflow from settling tank 198 is directed through line 202 back to inlet 24 as shown.

Figure 5:
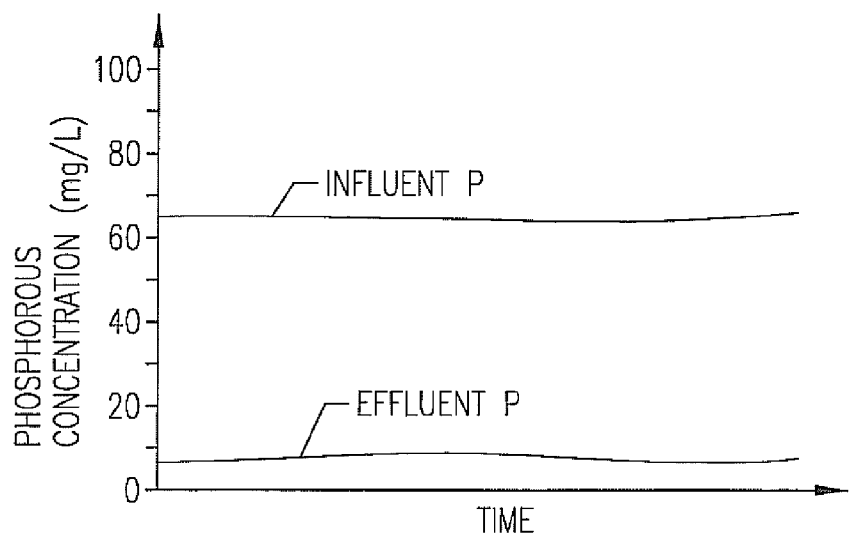
FIG. 5 is a graph of phosphorus concentration versus time for the system depicted in FIG. 4, illustrating the steady state condition achieved using the system.

FIG. 5 is a graph of soluble phosphorus concentration versus time, and illustrates a hypothetical operation of the precipitator 168 in the dual-lagoon situation of FIG. 4. As shown, the influent soluble phosphorus level is substantially constant, as is the effluent soluble phosphorus level. Thus, the precipitator 168 can readily treat and maintain the FIG. 4 waste water system. Systems such as seen in FIG. 4 will work in municipal facilities, and on some farms where waste water flows somewhat steadily and continuously through at least two lagoons in series at low flow rates of 5-100 gpm. To accommodate a cattle feedlot that does not have two adjacent lagoons, several large systems each capable of handing 400-1000 gpm flow rates, or alternately, one mobile unit, would need to be placed on the feedlot. These systems might need to operate for only a few days a month.

Figure 6:
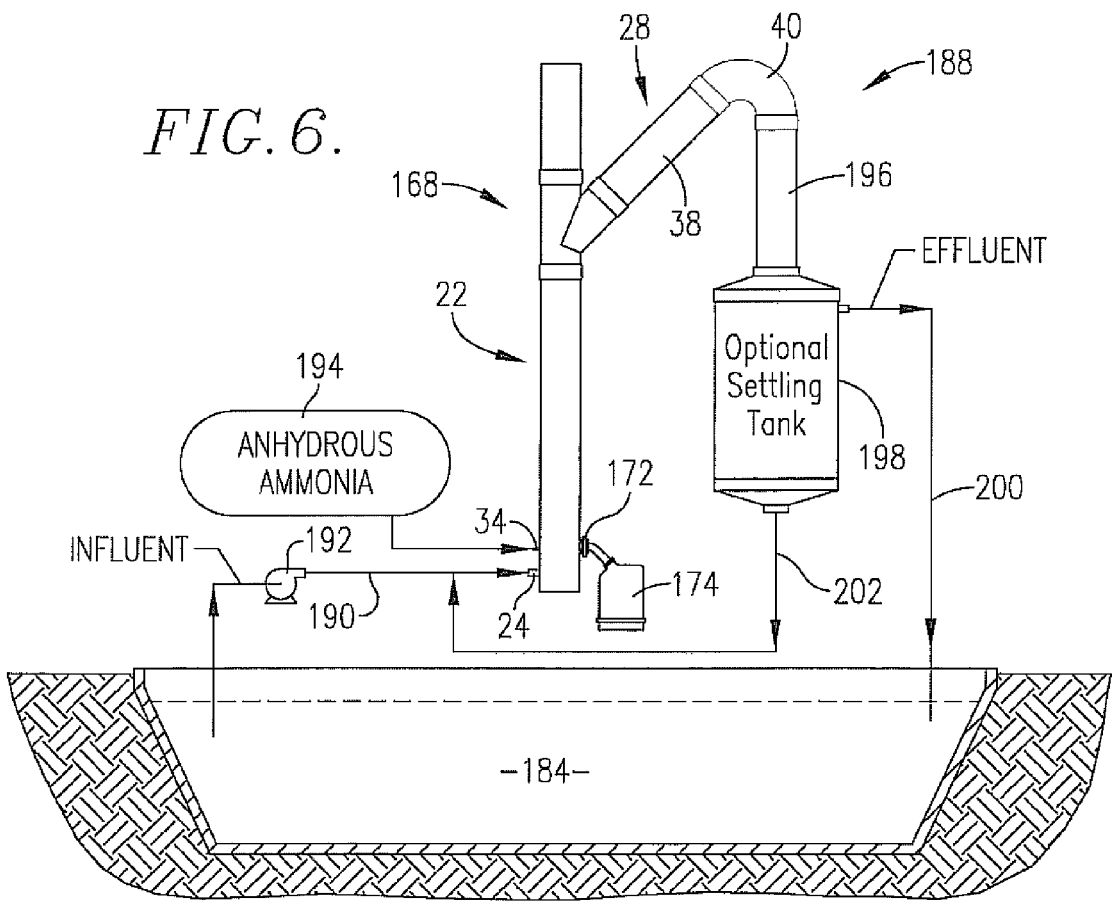
FIG. 6 is a schematic illustration similar to that of FIG. 4, but illustrating a fluidized bed precipitator system in accordance with the invention, for use with a single collection pond.

However, if desired, a transient configuration may be employed where waste water is withdrawn from one lagoon, treated to remove soluble phosphorus, and then returned to the same lagoon. It is therefore a dynamic system which responds in a flexible manner to an influent that changes in composition over the course of a treatment period. Attention is directed to FIG. 6 which illustrates such a system using only a single lagoon 184 and including the precipitator 168 of FIG. 4, altered only in that the effluent line 200 directs treated water back to the single lagoon 184.

Figure 7:
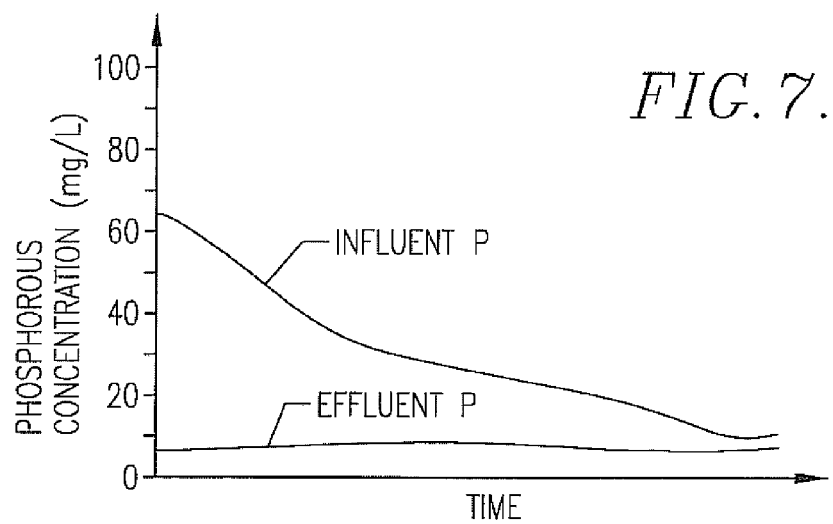
FIG. 7 is a graph of phosphorous concentration versus time for the system depicted in FIG. 6, illustrating the transient condition achieved using the system.

FIG. 7 is a graph of soluble phosphorus concentration versus time, and illustrates a hypothetical operation of the precipitator 168 in the single lagoon situation of FIG. 6. As seen, the soluble phosphorus concentration begins at a high point and changes over time owing to the treatment effected by precipitator 168, until the influent and effluent soluble phosphorus levels are similar. Thus, the system is transient depending upon the starting soluble phosphorus concentration. One potential problem with transient systems is that the changing pH of the inlet lagoon waters may cause precipitation outside the system, thus reducing the amounts of phosphates recovered in the system.

While the invention has been described in the context of treating lagoon waste waters, it will be appreciated that the invention is not so limited. For example, the invention may be used to treat aqueous streams containing soluble phosphates derived from the treatment of distiller's dried grains to reduce the phosphorus content thereof. Broadly speaking, the invention may be used to process any fluid containing undesirable precipitates.

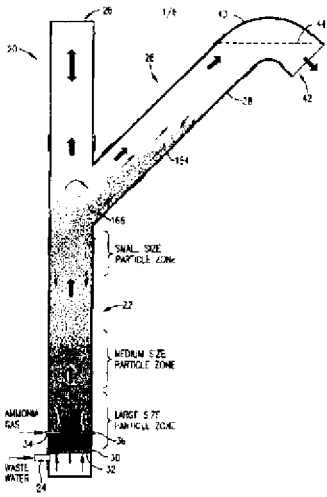

We claim:
1. A method of treating a fluid including precipitatable materials therein, said method comprising the steps of:
  directing said fluid into the lower end of an elongated primary tubular section presenting a first upright longitudinal axis;
  creating fluidized bed conditions within said primary tubular section, and allowing precipitated particles to collect adjacent the lower end of the primary tubular section;
  directing portions of said fluid within said primary tubular section into a settling section operably coupled with and in communication with the interior of said primary tubular section above said inlet,
  said settling section presenting a plurality of oblique flow paths oriented in the direction of a second longitudinal axis through said settling section, said second longitudinal axis being oriented at an acute angle relative to said first upright axis of said primary tubular section to allow said precipitated particles to settle from said fluid, said fluid flowing through said plurality of flow paths to a settling section outlet; and allowing precipitated particles within the settling section to descend into the primary tubular section and collect adjacent the lower end of the primary tubular section.

2. The method of claim 1, said second longitudinal axis being oriented at an angle of from about 10-80°.

3. The method of claim 2, said angle being from about 30-60°.

4. The method of claim 1, including the steps of detecting a buildup of solids in said primary tubular section, and periodically allowing withdrawal of solids from the primary tubular section, said solids detecting and withdrawal steps including the steps of sensing the pressure within solids collected within said primary tubular section, and withdrawing solids from the primary tubular section when said sensed pressure reaches a predetermined level.

5. The method of claim 4, including the step of sensing the pressures within said solids collected within said primary tubular section at vertically spaced apart locations, and determining the pressure differential between said locations.

6. The method of claim 4, including the step of depositing said withdrawn solids into a solids collection vessel.

7. The method of claim 4, said solids withdrawal step comprising the step of opening a drain valve operably coupled with said primary tubular section.

8. The method of claim 4, said fluid comprising waste-containing liquid from a concentrated animal feeding operation, said liquid including precipitatable phosphorus.

9. The method of claim 1, including the step of allowing gas to exit from said settling section.

10. A method of treating a fluid including precipitatable materials therein, said method comprising the steps of:
   directing said fluid into the lower end of an elongated primary tubular section presenting a first upright longitudinal axis;
   creating fluidized bed conditions within said primary tubular section, and allowing precipitated particles to collect adjacent the lower end of the primary tubular section;
   directing a portion of said fluid within said primary tubular section through an outlet therein; and
   detecting a buildup of solids in said primary tubular section, and periodically allowing withdrawal of solids from the primary tubular section, said solids detecting and withdrawal steps including the steps of sensing the pressure within solids collected within said primary tubular section, and withdrawing solids from the primary tubular section when said sensed pressure reaches a predetermined level.

11. The method of claim 10, including the step of sensing the pressures within said solids collected within said primary tubular section at vertically spaced apart locations, and determining the pressure differential between said locations.

12. The method of claim 10, including the step of depositing said withdrawn solids into a solids collection vessel.

13. The method of claim 10, said solids withdrawal step comprising the step of opening a drain valve operably coupled with said primary tubular section.

14. The method of claim 10, said fluid comprising waste-containing liquid from a concentrated animal feeding operation, said liquid including precipitatable phosphorus.

15. A method of treating a fluid including precipitatable materials therein, said method comprising the steps of:
   directing said fluid into the lower end of an elongated primary tubular section presenting a first upright longitudinal axis;
   creating fluidized bed conditions within said primary tubular section, and allowing precipitated particles to collect adjacent the lower end of the primary tubular section;
   directing portions of said fluid within said primary tubular section into a settling section operably coupled with and in communication with the interior of said primary tubular section above said inlet,
   said settling section presenting a second longitudinal axis oriented at an acute angle relative to said first upright axis of said primary tubular section,
   said settling section comprising a settling arm extending obliquely from said primarily tubular section;
   directing a portion of said fluid within said settling section through a settling section outlet; and
   allowing precipitated particles within the settling section to descend into the primary tubular section and collect adjacent the lower end of the primary tubular section.

* * * * *

UNITED STATES PATENT AND TRADEMARK OFFICE
CERTIFICATE OF CORRECTION

| | | |
|---|---|---|
| PATENT NO. | : 8,017,019 B2 | Page 1 of 1 |
| APPLICATION NO. | : 12/139281 | |
| DATED | : September 13, 2011 | |
| INVENTOR(S) | : Gina Young Becker et al. | |

It is certified that error appears in the above-identified patent and that said Letters Patent is hereby corrected as shown below:

Col. 16, Line 42 insert

-- 16. The method of claim 1, said setting section being rectangular in plan configuration. --

Signed and Sealed this
Twenty-fourth Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,017,019 B2 | Page 1 of 2 |
| APPLICATION NO. | : 12/139281 | |
| DATED | : September 13, 2011 | |
| INVENTOR(S) | : Gina Young Becker et al. | |

It is certified that error appears in the above-identified patent and that said Letters Patent is hereby corrected as shown below:

Delete the title page and substitute therefore the attached title page showing the corrected number of claims in patent.

Col. 16, Line 42 insert

-- 16. The method of claim 1, said setting section being rectangular in plan configuration. --

This certificate supersedes the Certificate of Correction issued January 24, 2012.

Signed and Sealed this
Fourteenth Day of February, 2012

David J. Kappos
*Director of the United States Patent and Trademark Office*

(12) United States Patent
Becker et al.

(10) Patent No.: US 8,017,019 B2
(45) Date of Patent: Sep. 13, 2011

(54) FLUIDIZED BED PRECIPITATOR WITH OPTIMIZED SOLIDS SETTLING AND SOLIDS HANDLING FEATURES FOR USE IN RECOVERING PHOSPHORUS FROM WASTEWATER

(75) Inventors: Gina Young Becker, Manhattan, KS (US); Sigifredo Castro Diaz, Manhattan, KS (US); Michael Hanson, Edmond, OK (US); Kylo Martin Heller, Tescott, KS (US); Dean Thompson, St. Joseph, MO (US)

(73) Assignees: Kansas State University Research Foundation, Manhattan, KS (US); Kansas Environmental Management Associates, LLC, Topeka, KS (US)

( * ) Notice: Subject to any disclaimer, the term of this patent is extended or adjusted under 35 U.S.C. 154(b) by 552 days.

(21) Appl. No.: 12/139,281

(22) Filed: Jun. 13, 2008

(65) Prior Publication Data
US 2008/0314838 A1 Dec. 25, 2008

Related U.S. Application Data

(60) Provisional application No. 60/943,986, filed on Jun. 14, 2007.

(51) Int. Cl.
*C02F 1/52* (2006.01)
(52) U.S. Cl. ........ 210/709; 210/715; 210/718; 210/741; 210/802; 210/803; 210/903; 210/906
(58) Field of Classification Search .............. 210/709
See application file for complete search history.

(56) References Cited

U.S. PATENT DOCUMENTS

| | | | |
|---|---|---|---|
| 2,946,439 A * | 7/1960 | Condolios et al. | 209/157 |
| 3,050,383 A | 8/1962 | Wilson | |
| 3,348,910 A | 10/1967 | Goodenough et al. | |
| 3,459,530 A | 8/1969 | Hudson | |
| 3,476,510 A | 11/1969 | Kern et al. | |
| 3,510,266 A | 5/1970 | Midler, Jr. | |
| 3,892,539 A | 7/1975 | Midler, Jr. | |
| 3,933,577 A | 1/1976 | Penque | |
| 3,966,450 A | 6/1976 | O'Neill et al | |
| 4,075,095 A * | 2/1978 | Parnaby | 210/793 |
| 4,141,824 A * | 2/1979 | Smith | 210/618 |
| 4,321,078 A | 3/1982 | Michaud | |
| 4,389,317 A | 6/1983 | Trentelman et al. | |
| 4,431,543 A | 2/1984 | Matsuo et al. | |
| 4,457,773 A | 7/1984 | Sley | |
| 4,576,627 A | 3/1986 | Hughes | |

(Continued)

*Primary Examiner* — Peter A Hruskoci
(74) *Attorney, Agent, or Firm* — Hovey Williams LLP

(57) ABSTRACT

Improved fluidized bed precipitators (20, 46, 62, 74, 108, 112, 134, 168) especially useful for the treatment of waste waters containing soluble phosphorus are provided, having upright, primary fluidized bed sections (22, 48, 64, 76, 110, 114, 136) and obliquely oriented solids settling sections (28, 54, 68, 120, 144) which enhance the settling of small particles (166) and return thereof to the fluidized bed sections (22, 48, 64, 76, 110, 114, 136). The precipitators (20, 46, 62, 74, 108, 112, 134, 168) may also be equipped with a solids detection/ withdrawal assembly (178) made up of one or more pressure transducers (180, 182) operable to determine the pressures within the fluidized bed sections 22, 48, 64, 76, 110, 114, 136) as a measure of bed densities, along with a selectively operable valve (172) which may be opened to periodically remove solids without clogging. The precipitators (20, 46, 62, 74, 108, 112, 134, 168) may be used to control soluble phosphorus levels in single- or multiple lagoon (184, 186) waste water systems.

16 Claims, 6 Drawing Sheets

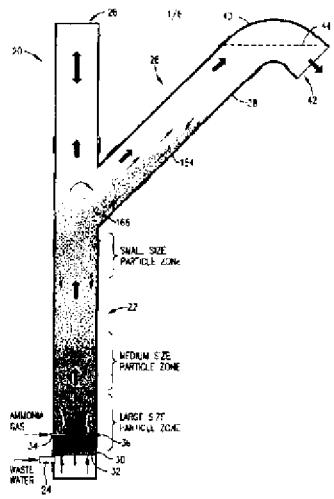

UNITED STATES PATENT AND TRADEMARK OFFICE
CERTIFICATE OF CORRECTION

| | |
|---|---|
| PATENT NO. | : 8,017,019 B2 |
| APPLICATION NO. | : 12/139281 |
| DATED | : September 13, 2011 |
| INVENTOR(S) | : Gina Young Becker et al. |

It is certified that error appears in the above-identified patent and that said Letters Patent is hereby corrected as shown below:

Delete title page and substitute therefore the attached title page showing the corrected number of claims in patent.

Col. 16, Line 42 insert

-- 16. The method of claim 1, said settling section being rectangular in plan configuration. --

This certificate supersedes the Certificates of Correction issued January 24, 2012 and February 14, 2012.

Signed and Sealed this
Third Day of April, 2012

David J. Kappos
*Director of the United States Patent and Trademark Office*

(12) United States Patent
Becker et al.

(10) Patent No.: US 8,017,019 B2
(45) Date of Patent: Sep. 13, 2011

(54) FLUIDIZED BED PRECIPITATOR WITH OPTIMIZED SOLIDS SETTLING AND SOLIDS HANDLING FEATURES FOR USE IN RECOVERING PHOSPHORUS FROM WASTEWATER

(75) Inventors: Gina Young Becker, Manhattan, KS (US); Sigifredo Castro Diaz, Manhattan, KS (US); Michael Hanson, Edmond, OK (US); Kyle Martin Heller, Tescott, KS (US); Dean Thompson, St. Joseph, MO (US)

(73) Assignees: Kansas State University Research Foundation, Manhattan, KS (US); Kansas Environmental Management Associates, LLC, Topeka, KS (US)

( * ) Notice: Subject to any disclaimer, the term of this patent is extended or adjusted under 35 U.S.C. 154(b) by 552 days.

(21) Appl. No.: 12/139,281

(22) Filed: Jun. 13, 2008

(65) Prior Publication Data
US 2008/0314838 A1 Dec. 25, 2008

Related U.S. Application Data

(60) Provisional application No. 60/943,986, filed on Jun. 14, 2007.

(51) Int. Cl.
*C02F 1/52* (2006.01)
(52) U.S. Cl. ........ 210/709; 210/715; 210/718; 210/741; 210/802; 210/803; 210/903; 210/906
(58) Field of Classification Search ............... 210/709
See application file for complete search history.

(56) References Cited

U.S. PATENT DOCUMENTS

| | | | |
|---|---|---|---|
| 2,946,439 A * | 7/1960 | Condolios et al. | 209/157 |
| 3,050,383 A | 8/1962 | Wilson | |
| 3,348,910 A | 10/1967 | Goodenough et al. | |
| 3,459,530 A | 8/1969 | Hudson | |
| 3,476,510 A | 11/1969 | Kern et al. | |
| 3,510,266 A | 5/1970 | Midler, Jr. | |
| 3,892,539 A | 7/1975 | Midler, Jr. | |
| 3,933,577 A | 1/1976 | Penque | |
| 3,966,450 A | 6/1976 | O'Neill et al | |
| 4,075,095 A * | 2/1978 | Parnaby | 210/793 |
| 4,141,824 A * | 2/1979 | Smith | 210/618 |
| 4,321,078 A | 3/1982 | Michaud | |
| 4,389,317 A | 6/1983 | Trentelman et al. | |
| 4,431,543 A | 2/1984 | Matsuo et al. | |
| 4,457,773 A | 7/1984 | Sley | |
| 4,576,627 A | 3/1986 | Hughes | |

(Continued)

*Primary Examiner* — Peter A Hruskoci
(74) *Attorney, Agent, or Firm* — Hovey Williams LLP

(57) ABSTRACT

Improved fluidized bed precipitators (20, 46, 62, 74, 108, 112, 134, 168) especially useful for the treatment of waste waters containing soluble phosphorus are provided, having upright, primary fluidized bed sections (22, 48, 64, 76, 110, 114, 136) and obliquely oriented solids settling sections (28, 54, 68, 120, 144) which enhance the settling of small particles (166) and return thereof to the fluidized bed sections (22, 48, 64, 76, 110, 114, 136). The precipitators (20, 46, 62, 74, 108, 112, 134, 168) may also be equipped with a solids detection/withdrawal assembly (178) made up of one or more pressure transducers (180, 182) operable to determine the pressures within the fluidized bed sections 22, 48, 64, 76, 110, 114, 136) as a measure of bed densities, along with a selectively operable valve (172) which may be opened to periodically remove solids without clogging. The precipitators (20, 46, 62, 74, 108, 112, 134, 168) may be used to control soluble phosphorus levels in single- or multiple lagoon (184, 186) waste water systems.

16 Claims, 6 Drawing Sheets